Patented Mar. 3, 1953

2,630,454

UNITED STATES PATENT OFFICE 2,630,454

DIBASIC ETHER ACID DERIVATIVES OF VANILLIC ACID

Louis H. Bock, Shelton, Wash., assignor to Rayonier Incorporated, Shelton, Wash., a corporation of Delaware No Drawing. Application November 28, 1950, Serial No. 198,047

1 Claim. (Cl. 260—520)

This invention relates to organic compounds, especially to dibasic acids, and has for its object the provision of a method of producing the dibasic acids.

The dibasic acids produced according to the invention have the following chemical structure:

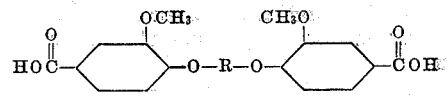

in which R is a divalent aliphatic group represented by the following examples:

—$CH_2$—$CH_2$—
—$CH_2$—$CH_2$—$CH_2$—
—$(CH_2)_n$— where $n$ is 2 to 6
—$CH_2CH_2OCH_2CH_2$—

In accordance with the method of the invention, these acids are all prepared from vanillic acid by the following series of reactions:

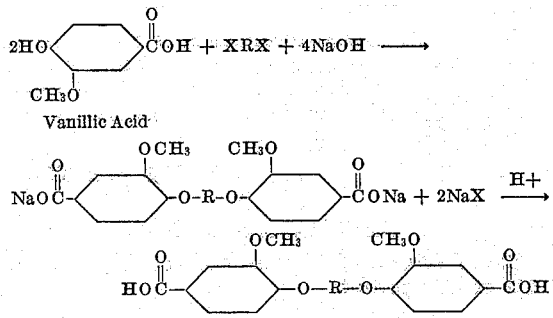

R in the above formulas is the same as described above. X is chlorine or bromine.

Vanillic acid, the starting material is potentially available in great abundance by the alkaline oxidation of sulfite waste liquor which is a by-product in the manufacture of cellulose from wood. Thus, the products produced by the method of this invention may be made in quantity from raw materials which have, at present, no economic value and are, in fact, a menace to aquatic and marine life as they are usually dumped into rivers or bays.

The preparation of the dibasic acids according to the method of this invention is illustrated by the following examples:

Example 1

A mixture of 84 parts of vanillic acid, 40 parts of sodium hydroxide, 500 parts of water, and 47 parts of ethylene dibromide was placed in a vessel equipped with a mechanical stirrer and reflux condenser. The mixture was stirred at a temperature of 73°–75° C. for 22 hours. Titration of a sample of the reaction mixture at this time indicated that 92% of the sodium hydroxide had reacted. Ten parts of sodium hydroxide was then added and stirring and refluxing was continued for 4 hours in order to saponify any ester which might have formed. The solution was then cooled and saturated with $SO_2$. A white precipitate formed which was filtered, washed with water, and dried. The yield was 63.8 parts corresponding to 70% of the theoretical yield. The product melted at 270°–280° C. It was further purified by boiling with 500 parts of ethyl alcohol and filtering hot to remove any unreacted vanillic acid. This treatment yielded 54 parts of white powder melting at 278°–281° C. Its neutralization equivalent was 179 compared to a theoretical value of 181 for a dibasic acid of the formula $C_{18}H_{18}O_8$. The product was ethane-1,2-bis-(2-methoxy-4-carboxyphenyl) ether.

Example 2

A stainless steel autoclave with mechanical stirrer was charged with a mixture of 42 parts of vanillic acid, 20 parts of sodium hydroxide, 300 parts of water and 15 parts of ethylene dichloride. The autoclave was heated with stirring 2 hours at a temperature of 105°–142° C. The maximum pressure was 53 pounds per square inch (gauge). After cooling, the autoclave was opened and the solution was saturated with sulfur dioxide. A fine precipitate formed which was filtered and dried. The product was crude ethane-1,2 - bis - (2 - methoxy - 4 - carboxyphenyl) ether. The yield was 36.5 parts or 80.7% of theory.

Example 3

A mixture of 336 parts of vanillic acid, 164 parts of sodium hydroxide, 2000 parts of water and 202 parts of trimethylene dibromide was placed in a vessel equipped with mechanical stirrer and reflux condenser. The mixture was stirred and heated to refluxing for 7.25 hours. The resulting clear solution was poured into an excess of dilute hydrochloric acid whereupon a fine precipitate formed. This was removed from the mother liquor by filtration, was washed with water and dried. The product melted at 210°–224° C. and had a neutralization equivalent of 182 compared to a theoretical value of 188 for a dibasic acid of the formula $C_{19}H_{20}O_8$. The yield was 329 parts or 87.5% of theory. Recrystallization from the monoethyl ether of ethylene glycol gave a product with a melting point of 242°–246° C. The product was propane-1,3-bis-(2-methoxy-4-carboxyphenyl) ether.

*Example 4*

A stainless steel autoclave equipped with mechanical stirrer was charged with a mixture of 101 parts of vanillic acid, 49.2 parts of sodium hydroxide, 750 parts of water and 39.1 parts of 1,4-dichlorobutane. The autoclave was heated with stirring 3 hours at 142°–170° C. The maximum pressure was 133 pounds per square inch (gauge). After cooling the resulting clear solution was poured into an excess of dilute hydrochloric acid. A fine precipitate formed which was removed by filtration. After washing and drying it weighed 68.9 parts. After crystallization from the monoethyl ether of ethylene glycol the melting point was 236°–244° C. The neutralization equivalent was 203 compared to a theoretical value of 195 for a dibasic acid of the formula $C_{20}H_{22}O_8$. The product was butane-1,4-bis-(2-methoxy-4-carboxyphenyl) ether.

*Example 5*

A mixture of 330 parts of vanillic acid, 160 parts of sodium hydroxide, 2000 parts of water and 143 parts of bis-(2-chloroethyl) ether was placed in a vessel equipped with a mechanical stirrer and heated to refluxing for 40 hours. The clear reaction mixture was poured into an excess of dilute hydrochloric acid solution whereupon a fine precipitate formed. This was filtered, washed and dried yielding 200 parts of product melting at 208°–217° C. The product had a neutralization equivalent of 199 compared to a theoretical value of 203 for a dibasic acid of the formula $C_{20}H_{22}O_9$. The product was bis(2-methoxy-4-carboxyphenoxyethyl) ether.

*Example 6*

A mixture of 138 parts of vanillic acid, 66 parts of sodium hydroxide, 2000 parts of water and 100 parts of hexamethylene dibromide was placed in a vessel equipped with a mechanical stirrer and heated to refluxing with stirring for 23 hours. The reaction mixture was cooled and saturated with $SO_2$. A precipitate formed which was filtered, washed with water and dried. The yield was 156 parts. It was crystallized from the monoethyl ether of ethylene glycol to give a product melting at 216°–224° C. The product was hexane-1,6-bis(2-methoxy-4-carboxyphenyl) ether.

In all of the examples above, the compounds are named according to the Geneva system of nomenclature and all of them are dibasic acids of the general formula first set forth herein.

The compounds produced according to the invention may be used advantageously, for example, in the preparation of alkyd resins, and in the preparation of linear polyesters and linear polyamides employed in the manufacture of synthetic textile fibers.

For the preparation of a linear polyester for extrusion into a textile fiber, the preferred acid is the one in which the R group in the above formula is —$CH_2CH_2$— as this acid has the highest melting point and the polyesters made from it have high melting points. For the preparation of linear polyamides and alkyd resins, the R group can be chosen to give the desired softening point and hardness to the resulting polymer. Thus, larger R groups give more flexible resins while the short R groups give harder resins.

My copending application Serial No. 198,048 filed November 28, 1950, describes and claims linear polyesters obtained by the condensation of a dihydric alcohol with the dibasic compounds.

I claim:

The method of producing dibasic acids which comprises heating in aqueous solution, vanillic acid, sodium hydroxide and a compound having the formula XRX at a temperature between about 73° C. and 224° C. for a length of time sufficient to form a compound having the formula

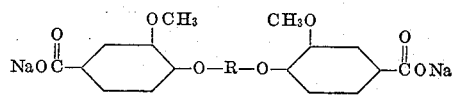

and reacting said last-named compound with a non-oxidizing mineral acid to form a dibasic acid having the formula

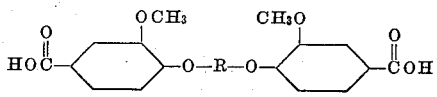

where in all of said formulae R is a member of the group consisting of —$(CH_2)_n$—, where $n$ is an integer from 2 to 6, and —$CH_2CH_2OCH_2CH_2$—, X being a halogen of atomic number between 17 and 35 inclusive.

LOUIS H. BOCK.

REFERENCES CITED

The following references are of record in the file of this patent:

Cahours, Beilstein (Handbuch, 4th ed.) vol. 10, p. 395 (1927).

Neish, Rec. trav. Chim., vol. 66, pp. 433–442 (1947).